United States Patent [19]

Geckle

[11] Patent Number: 5,269,061
[45] Date of Patent: Dec. 14, 1993

[54] METHOD FOR FORMING STRUCTURAL UNIT

[75] Inventor: Ned A. Geckle, Marion, Ohio

[73] Assignee: Dresser Industries, Inc., Dallas, Tex.

[21] Appl. No.: 843,563

[22] Filed: Feb. 28, 1992

[51] Int. Cl.5 ............................................. B23Q 3/00
[52] U.S. Cl. ............................ 29/897.312; 29/897.31;
29/464
[58] Field of Search .......... 29/897.3, 897.31, 897.312,
29/464, 466, 525.1; 52/645, 646, 638, 655;
403/170, 174, 176, 178, 217, 218, 219

[56] References Cited

U.S. PATENT DOCUMENTS

| | | | |
|---|---|---|---|
| 2,308,565 | 8/1940 | Mitchell | 29/155 |
| 2,995,223 | 8/1961 | Roys | 189/36 |
| 3,902,295 | 9/1975 | Yancey | 52/730 |
| 4,332,501 | 6/1982 | Slysh | 403/219 |
| 4,335,972 | 6/1982 | Rosenberry, Jr. | 403/11 |
| 4,344,716 | 8/1982 | Sigal | 403/13 |
| 4,633,566 | 1/1987 | Coppa | 29/897.31 X |
| 4,775,287 | 10/1988 | Hering, Sr. | 414/694 |

Primary Examiner—Timothy V. Eley
Attorney, Agent, or Firm—Vinson & Elkins

[57] ABSTRACT

A structure is formed by attaching structural units to a bulkhead and separating the bulkhead into first and second bulkhead members. New bulkheads are formed at each of the separated bulkhead members and a structural unit is coupled between the new bulkheads.

12 Claims, 4 Drawing Sheets

METHOD FOR FORMING STRUCTURAL UNIT

TECHNICAL FIELD OF THE INVENTION

This invention relates in general to the construction of structural units, and more particularly to a method and apparatus for forming field-modifiable structural units.

BACKGROUND OF THE INVENTION

Fabrication of large structures which comprise multiple units bolted together by means of flange plates, such as booms, require precise alignment of the holes and mating surfaces at the interface of the units. Consequently, booms and other structural units are generally manufactured by employing a "jig" or "fixture" to ensure the proper spacing and alignment of the flange plates at the end of each unit as it is fabricated.

Alternatively, the units are fabricated and then machined after welding which also requires expensive equipment and may also require a large jig or fixture.

In some instances, it is necessary or highly desirable to build the structural unit in the field. One instance would be where the structural unit is so large that it could not be readily transported to the desired final location. Another instance may be where the structure is very large and dimensionally exceeds the capabilities of standard machine tools and machine shops. In this situation, the jig or fixture may even be too large to transport to the job site and likewise would be very expensive for use on a single project.

Therefore, a need has arisen in the industry for a method and apparatus for constructing structures consisting of multiple removable or interchangeable sections while maintaining a high degree of accuracy of construction.

SUMMARY OF THE INVENTION

In accordance with the present invention, a method is provided for forming a structure which comprises multiple or removable sections without machining after welding or requiring expensive jigs and fixtures.

A first bulkhead assembly is formed by utilization of pre-machined and pre-bolted flange plates. After forming, the bulkhead comprises two separable parts which, after separation, maintain bolt alignment and parallelism for reassembly.

Primary structural units are then assembled to each side of the bulkhead assembly resulting in a structure which may be unbolted at the bulkhead permitting the structure to be separated into two structures. This process may be continued by reforming a new complete bulkhead at the interface surface of each of the original structures and attaching a structural unit between the two new bulkhead assemblies. The resulting structure may now be unbolted at either of two bulkheads forming a structure consisting of two structural end units and an optional, removable center section. This process may be repeated any number of times to create a longer basic structure comprised of numerous bolt-together modules.

The present invention provides significant advantages over the prior art. Because alignment is maintained at the interface of the connection modules between the bulkheads, a structure of indefinite length may be formed in the field without the need for expensive equipment. Further, bulkheads and the structural units therebetween may be separated from the structure and removed to reduce the size of a structure as necessary.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1a–i illustrate top views of flange plates;

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1A:
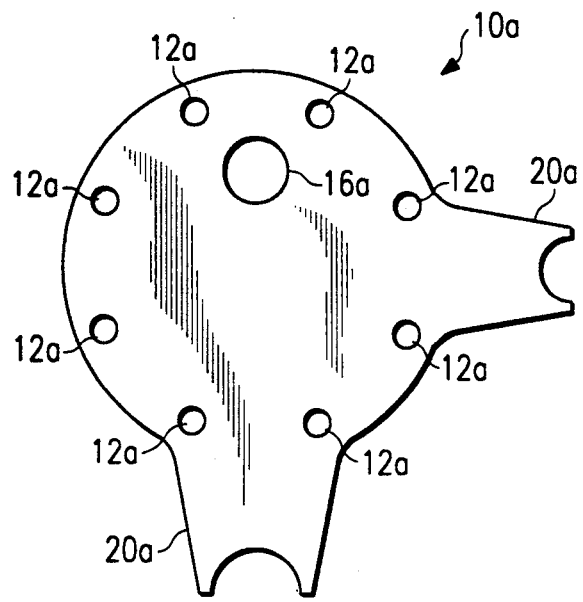
Figure 1B:
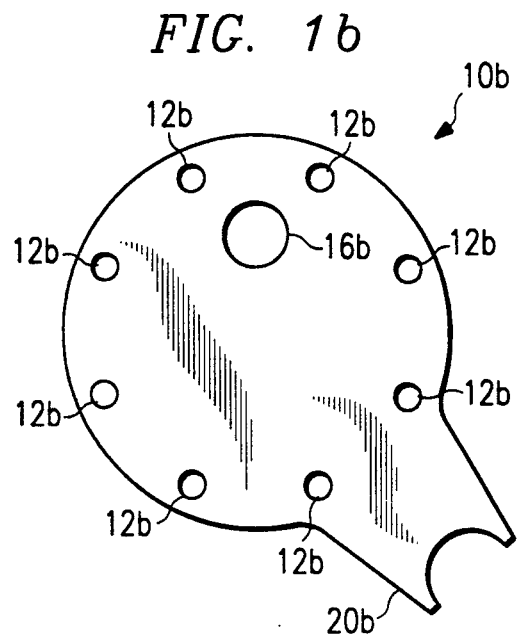

FIG. 1a–b illustrate flange plates as used in the present invention. Flange plate 10a comprises a flat flange plate having bolt holes 12a, and alignment hole 16a formed therein. Similarly, flange plate 10b has corresponding bolt holes 12b, and alignment hole 16b formed therein. Flange plate 10a has connecting ends 20a formed at right angles while flange plate 10b has a single connecting end 20b.

Figure 2A:
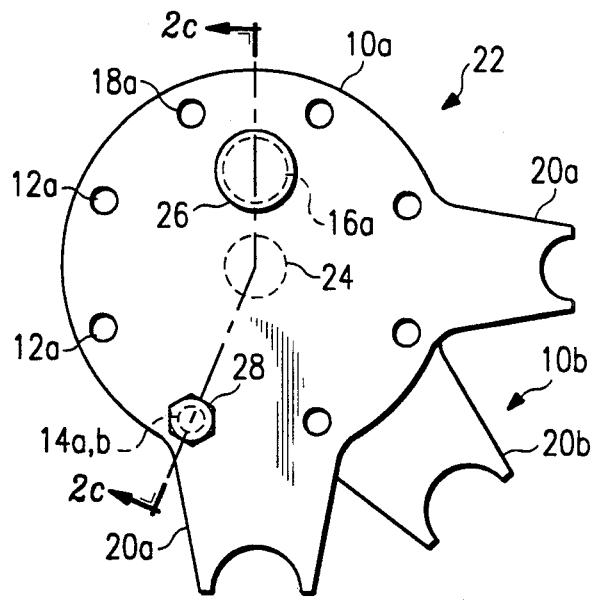
FIGS. 2a–c illustrate top, side and cross sectional views of the mated flange plates of FIGS. 1a–b.
Figure 2B:
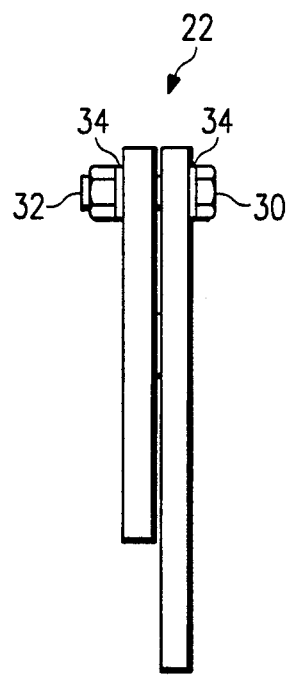
Figure 2C:
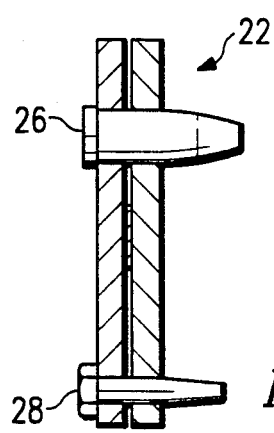

Flange plates 10a and 10b are coupled together as shown in FIGS. 2a–c to form flange assemblies 22. FIG. 2a is a top view of the flange assembly 22, FIG. 2b is a side view of the flange assembly 22 and FIG. 2c is a cross sectional view of the flange assembly 22. The flange plates 10a and 10b are coupled together with a weldment spacer 24 disposed between the two flange plates 10a–b. The weldment spacer 24 has a thickness of 0.060 inches. The weldment spacer 24 is placed between the two flange plates 10a–b and secured to one of the plates with an adhesive, such as PERMATEX, RTV or an equivalent. The two plates 10a–b are aligned by driving large tapered pin 26 through holes 16a–b and small tapered pin 28 through one of the pairs of bolt holes 12a–b, shown in FIG. 2a as holes 14a–b. The large drive pin 26 is tack-welded to one of the flange plates. Weldment bolts 30 are installed through corresponding holes 12a–b using nuts 32 and flat washers 34, as shown in FIG. 2b. In the preferred embodiment, the bolts are torqued to 1120 ft-lb at this stage. Thereafter, the small tapered pin 28 is removed and replaced with a weldment bolt 30, nut 22 and washers 34. All bolts are then torqued to 1560 ft-lb.

Figure 3A:
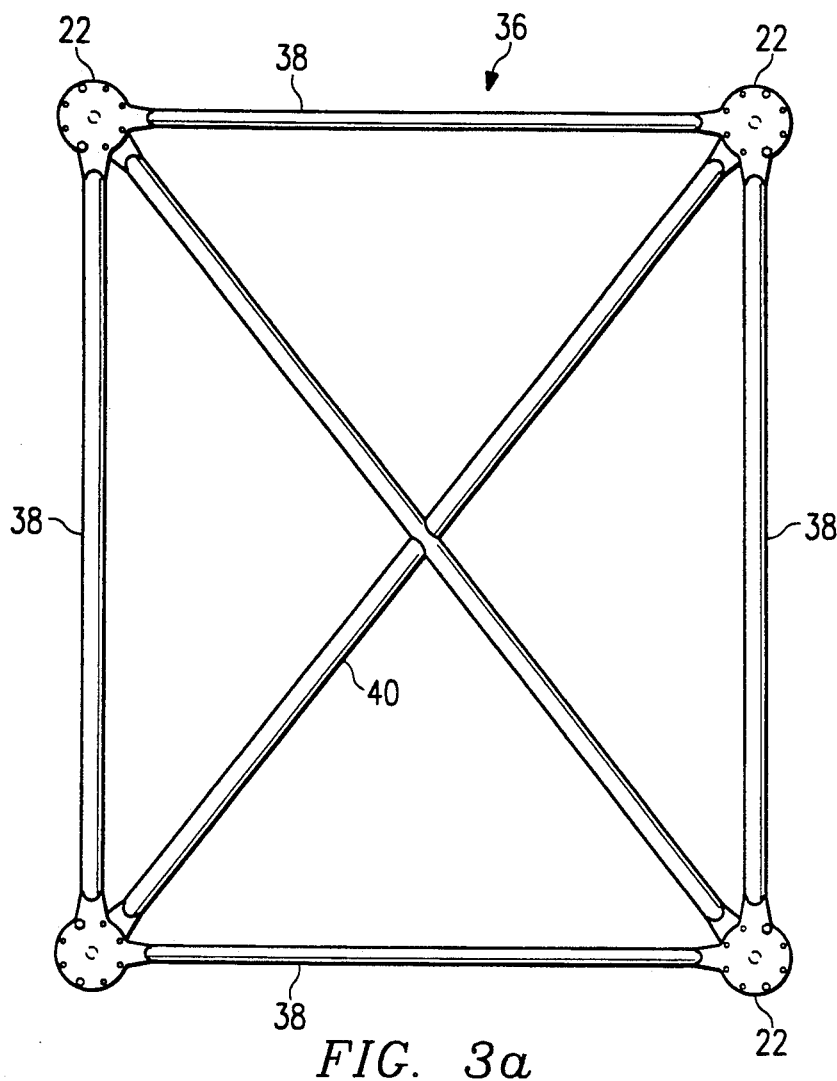
FIGS. 3a–b illustrate front and side views of bulkheads constructed using the flange assemblies of FIGS. 2a–c.
Figure 3B:
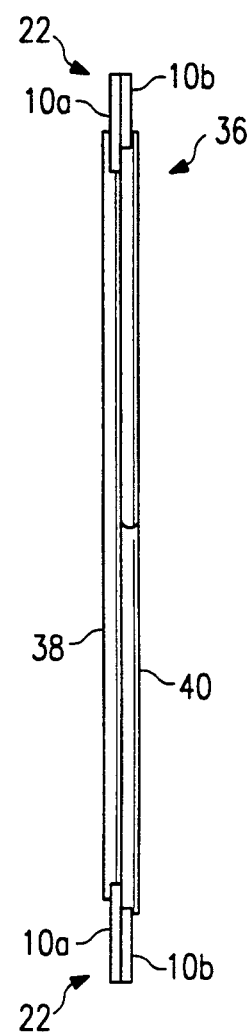

FIGS. 3a–b illustrate bulkhead 36 formed using the flange assemblies 22. Four flange assemblies 22 are located in a common plane and close dimensional tolerance in rectangular and diagonal direction. It may be desirable to use simple fixed length jigs to insure squareness of bulkhead structure prior to and/or during weldment of members 38 and 40. Outside structural members 38 are welded to the connecting ends 20 of the flange plates 10a to form a rectangular structure. Diagonal structural members 40 are welded to the connecting ends 20 of the flange plates 10b of the flange assemblies 22 to form an inner-diagonal structure. During formation of the flange assemblies 22, the flange plates are distorted because of weldment spacer 24. During subsequent welding, the plates will be distorted away from the weldment spacer 24. The net effect of the predistortion during assembly formation and welding distortion will be substantially flat plates 10a-b.

Figure 4A:
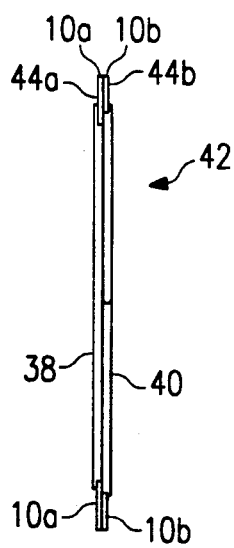
FIGS. 4a–f illustrate the steps to construct a structural unit using the bulkheads of FIG. 3.

FIGS. 4a-f illustrate construction of a structural unit using the bulkheads 36 of FIGS. 3a-b. In FIG. 4a, a first bulkhead 42 comprising outer structure 44a and inner-diagonal structure 44b is constructed as described in connection with FIGS. 1-3. Outer structure 44a comprises flange plate 10a and outer structural members 38 and inner-diagonal structure 44b comprises flange plate 10b and diagonal structure members 40.

Figure 4B:
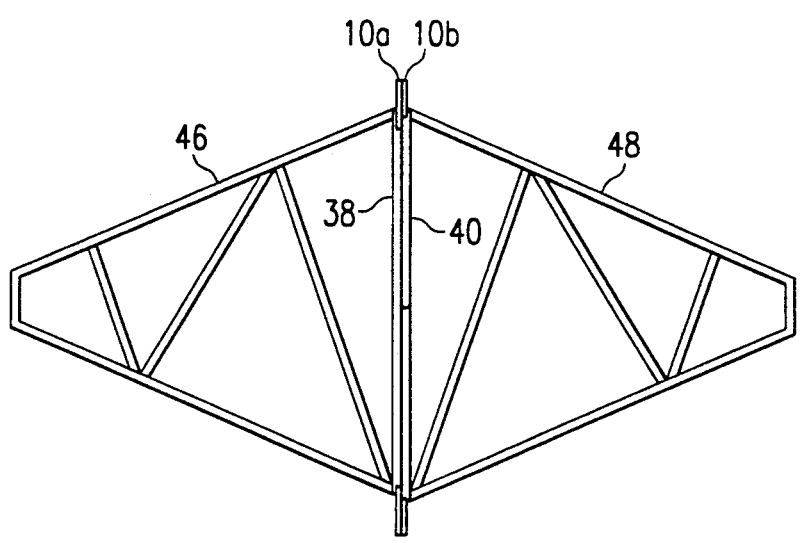

In FIG. 4b, a boom point structure 46 and a boom foot structure 48 are set up and aligned to the bulkhead 42. Typically, the boom point structure 46 and boom foot structure 48 comprise metal beams welded together.

Figure 4C:
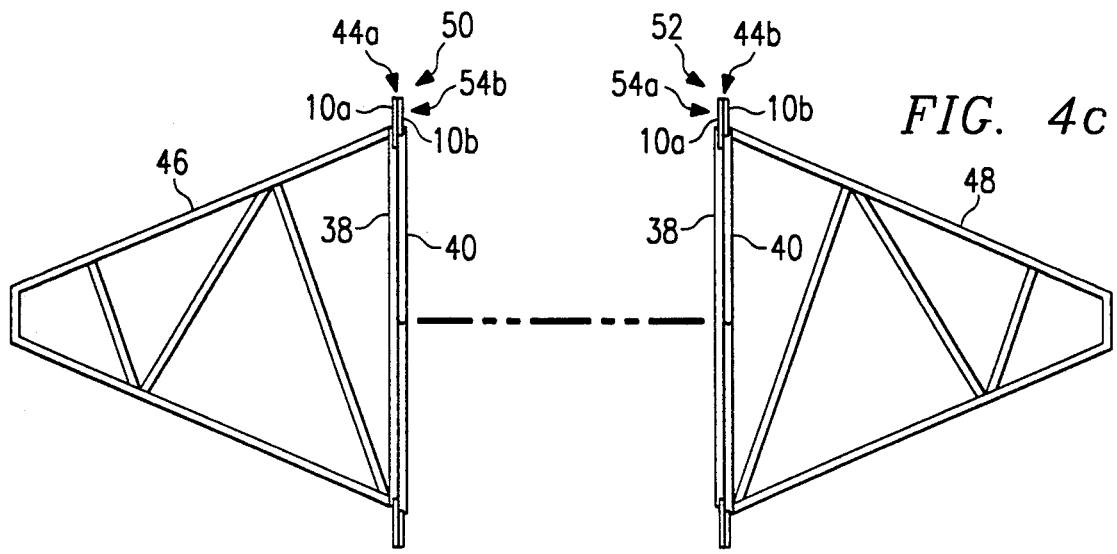
Figure 6A:
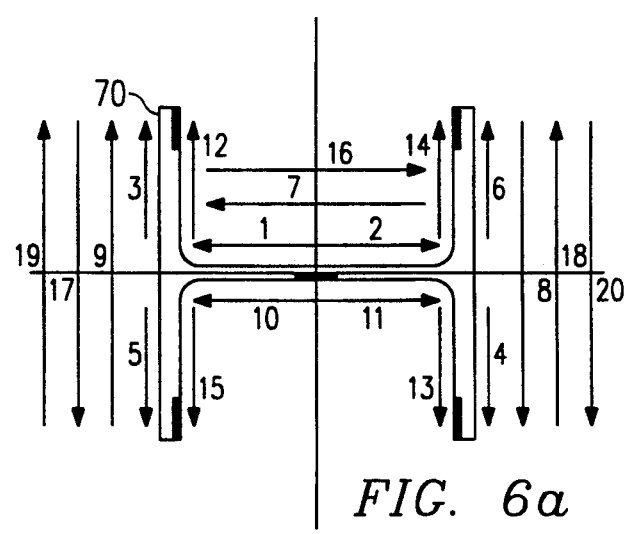
FIGS. 6a–c illustrates a weld sequence for structure attaching to flange plate.
Figure 6B:
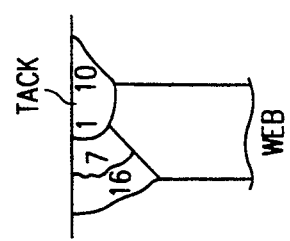
Figure 6C:
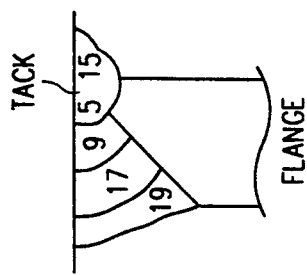

After construction of the boom point structure 46 and the boom foot structure 48, the two structures 46 and 48 are welded to the first bulkhead 42. As illustrated, the boom point structure 46 is welded to flange plates 10a and the boom foot structure 48 is welded to flange plates 10b. The welding sequence for welding the structures is shown in FIG. 6a-c. The first bulkhead 42 is then disassembled, as shown in FIG. 4c, by unbolting flange plates 10a-b, leaving outer structure 44a coupled to boom point structure 46 and inner-diagonal structure 44b coupled to boom foot structure 48. After separating the structures 44a-b, the respective flange plates 10a-b will remain flat due to the predistortion of the plates during assembly by weldment spacer 24. Bulkheads 50 and 52 are formed at the outer structure 44a and inner-diagonal structure 44b using the procedure described in connection with FIGS. 1-3. Hence, bulkhead 50 comprises outer structure 44a and new inner-diagonal structure 54b and bulkhead 52 comprises inner structure 44b and new outer-rectangular structure 54a.

Figure 4D:
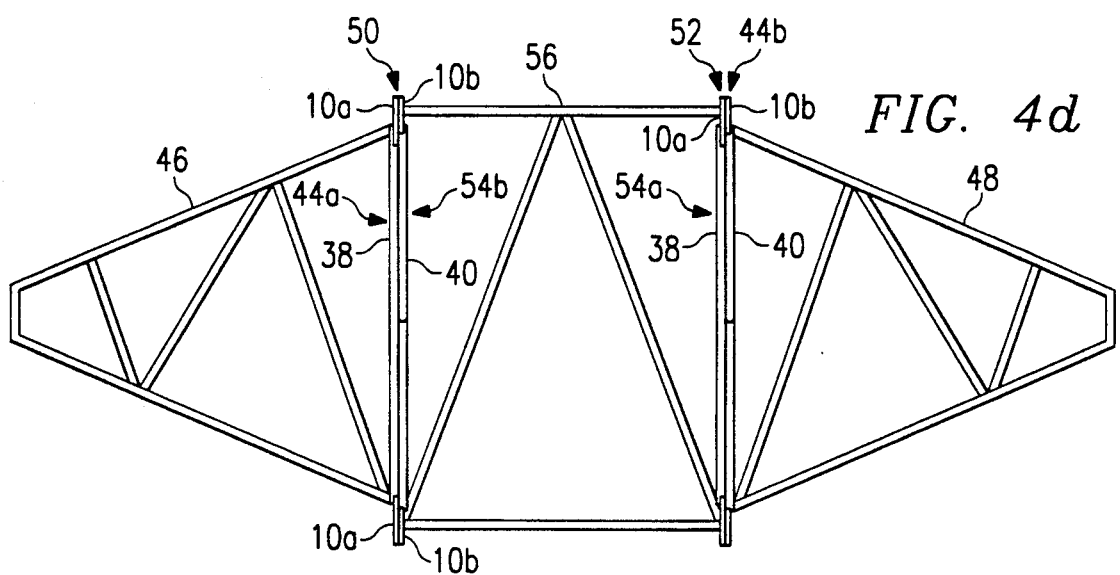

In FIG. 4d, the boom point 46 and boom foot 48 are separated a precise distance and aligned and a boom center section 56 is constructed between the bulkheads. The completed boom center section 56 is then welded to flange plate 10b of bulkhead 50 and flange plates 10a of bulkhead 52. Once again, after welding, the plates of the bulkheads 50 and 52 will be flat.

Figure 4E:
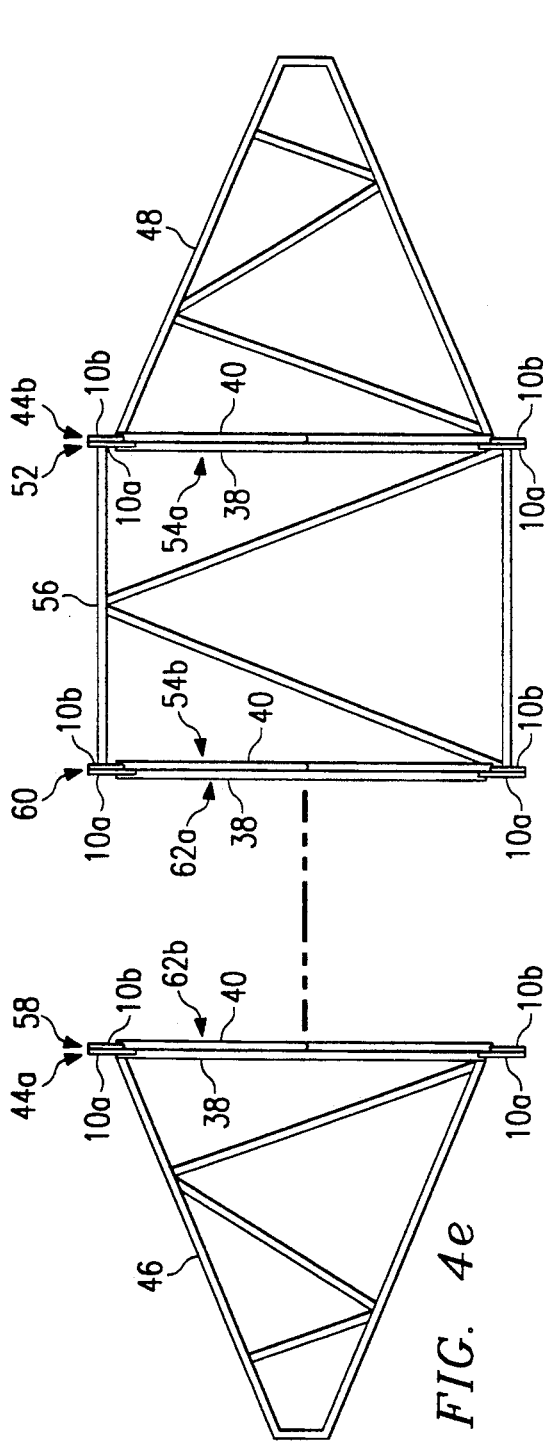
Figure 4F:
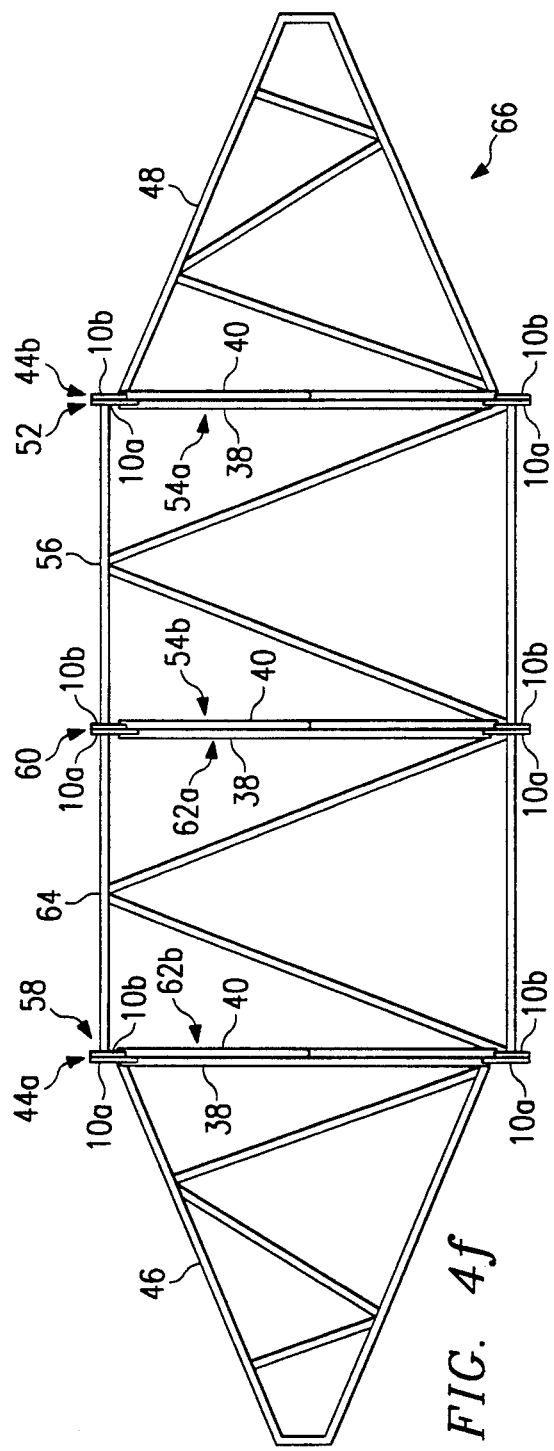

In FIG. 4e, the boom point 46 is separated a precise distance from, and aligned to, the other sections. Outer structure 44a and inner-diagonal structure 54b of bulkhead 50 are separated, and bulkheads 58 and 60 are formed by completing the procedure described in connection with FIGS. 1-3 to outer structure 44a and new inner-diagonal structure 54b. Hence, bulkhead 58 comprises outer structure 44a and inner-diagonal structure 62b and bulkhead 60 comprises inner-diagonal structure 54b and new outer structure 62a. A second boom center section 64 is coupled to the bulkheads 58 and 60. As previously described, the boom center section 64 is welded together between the bulkheads 58 and 60. The completed boom center section 64 is welded to plates 10b of bulkhead 58 and plates 10a of bulkhead 60.

Figure 5:
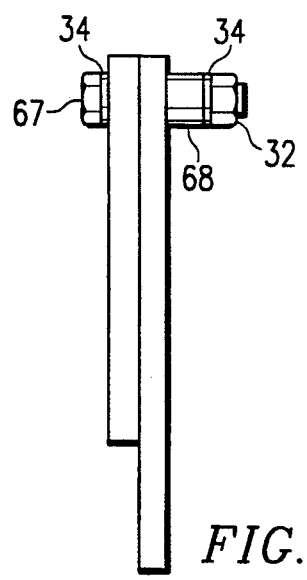
FIG. 5 illustrates a final bolt joint of the flange assemblies.

After completing the structural unit 66, the final boom assembly is performed. The weldment bolts 30 are removed from the flange plates along with the weldment spacers 24. The weldment bolts are replaced with seven bolts 67 and spacers 68, as shown in FIG. 5, and torqued to 1120 ft-lb. The small tapered pin 28 is removed and replaced with a bolt with spacer. All bolts are then torqued to 1560 ft-lb.

FIGS. 6a-c illustrate the flange and tack-weld sequence for welding an H-beam 70 (of one of the structures 46, 48, 56 and 64) to the flange plates. The H-beam is tack welded to the flange at five locations by a 0.25 inch fillet by 2 inches long in bevels. The beam is welded in the sequence shown:

0.25" pass in bevels of web from center outward (1,2)
0.25" pass in bevels of flange from centerline to edge (3,4,5,6)
0.25" pass in bevels of web - one way (7)
0.25" pass in bevels of flanges - one way (8,9)
back gouge web, then flanges, with 0.18 carbon arc and reweld web then flanges with 0.25" pass (10,11,12,13,14,15)
0.25" pass in bevel of web then flanges (one way) (16,17,18,19,20)

The present invention provides significant advantages over the prior art. Because new bulkhead assemblies are constructed at the end of each step, and because each half of the bulkhead is separately supported, the bulkheads may be separated and reformed to add or remove sections as desired. The predistortion of the flange plates during formation of the flange assemblies ensures that the flange plates will remain flat after welding.

Although the present invention and its advantages have been described in detail, it should be understood that various changes, substitutions and alterations can be made herein without departing from the spirit and scope of the invention as defined by the appended claims.

What is claimed is:

1. A method of forming a structure comprising the steps of:
   forming a first bulkhead assembly, said bulkhead assembly comprising a first member of a first member type and a second member of a second member type coupled together;
   coupling structural units to said first and second members;
   separating said first and second members;
   forming a second bulkhead assembly by coupling a third member of said second member type to said first member;
   forming a third bulkhead assembly by coupling a fourth member of said first member type to said second member; and
   coupling structural units between said third and fourth members.

2. The method of claim 1 and further comprising the steps of:
   separating one of said bulkheads into first and second member types;
   forming new bulkheads at the first and second member types of the separated bulkhead; and
   coupling structural units to said new bulkheads.

3. The method of claim 2 and further comprising the step of repeating said steps of separating one of said bulkheads into first and second member types, forming new bulkheads at the first and second member types and coupling structural units to said new bulkheads, until the desired structure is formed.

4. The method of claim 1 wherein said step of forming a first bulkhead assembly comprises the steps of:

forming flange assemblies by coupling first and second flange plates;

coupling supports to said first flange plates in a first pattern to form a member of the first member type; and coupling supports to said second flange plates in a second pattern to form a member of the second member type.

5. The method of claim 4 wherein said step of separating said first and second members comprises the step of separating the flange plates associated therewith.

6. The method of claim 4 wherein said step of forming flange assemblies comprises the step of forming flange assemblies by coupling flange plates together with a spacer of a predetermined thickness disposed therebetween to distort said flange plates.

7. The method of claim 6 wherein said step of coupling structural units to said first and second members comprises the step of welding structural units to the flange plates associated therewith, such that the distortion caused by said welding offsets the distortion caused by said spacer to produce substantially flat flange plates after welding.

8. A method of forming a structure comprising the steps of:

forming one or more bulkhead assemblies each comprising first and second separable member types; and repeating until a desired structure is formed the steps of:

separating one of said bulkhead assemblies into said first and second member types;

forming new bulkheads assemblies comprising first and second member types at said first and second member types of the separated bulkhead; and coupling a structural unit between the new bulkhead assemblies.

9. The method of claim 8 wherein said step of forming one or more bulkhead assemblies comprises the steps of:

forming flange assemblies by coupling first and second flange plates associated with respective first and second member types; and coupling supports to said flange plates in a predetermined pattern.

10. The method of claim 9 wherein said step of separating said first and second members comprises the step of separating the first and second flange plates associated with said first and second member types.

11. The method of claim 9 wherein said step of forming flange assemblies comprises the step of forming flange assemblies by coupling flange plates together with a spacer of a predetermined thickness disposed therebetween to distort said flange plates.

12. The method of claim 11 wherein said step of coupling a structural unit between said new bulkheads comprises the step of welding structural units to the flange plates associated therewith, such that the distortion caused by said welding offsets the distortion caused by said spacer to result in a substantially flat flange plates.

* * * * *

UNITED STATES PATENT AND TRADEMARK OFFICE
CERTIFICATE OF CORRECTION

PATENT NO. : 5,269,061
DATED : December 14, 1993
INVENTOR(S) : Ned A. Geckle

It is certified that error appears in the above-indentified patent and that said Letters Patent is hereby corrected as shown below:

Col. 2, line 9, delete "1a-i", insert --1a-b--.

Col. 2, line 58, delete "nut 22", insert --nut 32--.

Signed and Sealed this

Twenty-sixth Day of July, 1994

Attest:

BRUCE LEHMAN

*Attesting Officer*  *Commissioner of Patents and Trademarks*